G. W. ANSLEY.
Cartridge-Loading Device.

No. 159,013. Patented Jan. 26, 1875.

Witnesses
F. A. Kingsbury
J. Reuse

Inventor
Geo. W. Ansley
per Welles Bros.
Attys

UNITED STATES PATENT OFFICE.

GEORGE W. ANSLEY, OF MARSHALL, MICHIGAN.

IMPROVEMENT IN CARTRIDGE-LOADING DEVICES.

Specification forming part of Letters Patent No. 159,013, dated January 26, 1875; application filed November 6, 1874.

*To all whom it may concern:*

Be it known that I, GEO. W. ANSLEY, of the city of Marshall, State of Michigan, have invented a new and Improved Apparatus for Charging the Shells (either metallic or paper) of Breech-Loading Shot-Guns. The following is a full and accurate description of the device, reference being had to the accompanying drawing.

Figure 1:
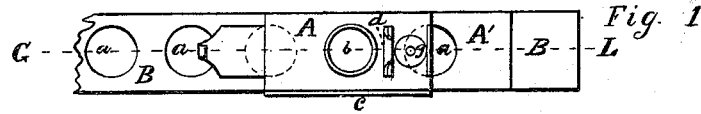
Figure 2:
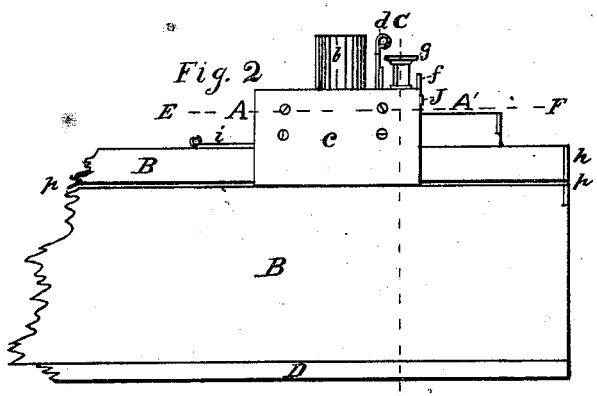
Figure 3:
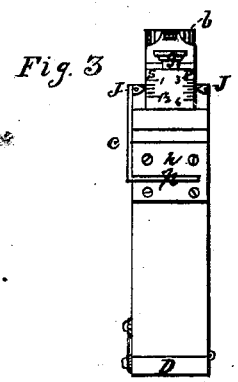
Figure 4:
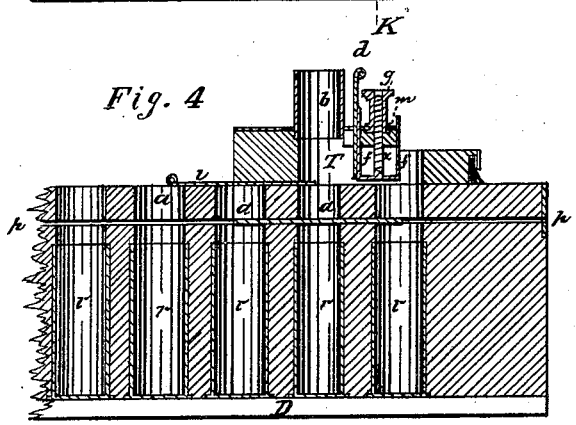
Figure 5:
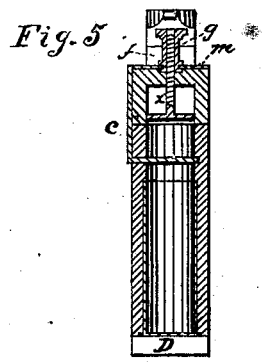
Figure 8:
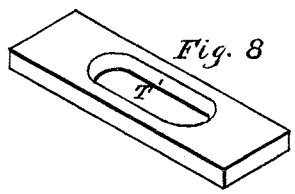
Figure 7:
Figure 6:
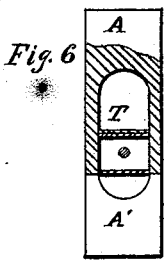

Figure 1 is a top view. Fig. 2 is a front side view. Fig. 3 is an end view. Fig. 4 is a longitudinal vertical section through G L, Fig. 1. Fig. 5 is a vertical cross-section through C K, Fig. 2. Fig. 6 is a horizontal section through E F, Fig. 2. Fig. 7 is a perspective of the gage $ff$. Fig. 8 is a perspective of a block that may be used instead of the gage, Fig. 7.

The apparatus consists of two distinct parts, viz., the distributer A A' and the shell-holder B B. The shell-holder is perforated with holes at equal distances apart, and of the same diameter as the caliber of the shells. The lower portion of the holes is reamed out to fit the outer diameter of the shells, and countersunk to receive the heads. There is thus an unbroken surface continuous from top to bottom, and along the bottom, when the shells have been inserted, as shown in the sectional view, Fig. 4, where $r$ represents the shells in place. D is a hinged bottom, which secures the shells in place while loading. A thin deep groove, $p\ p$, is cut in the shell-holder from end to end, and of a depth just sufficient to reach across the holes a little above the mouths of the shell. In this groove runs a flanged piece of sheet metal, $c$, of a breadth sufficient to entirely close the holes over which it passes. The distributer (shown in plan at Fig. 6, and in elevation at Figs. 2 and 3) has a plate of metal, $c$, fastened to its front side. This plate is bent at right angles, forming a flange, which slides freely in the groove $p\ p$, filling its entire depth, and of such length as to cover at least two of the shell-chambers $a\ a$. T T, Fig. 6, is an oblong chamber in the block A A'. In the rear portion of this chamber is a gage or strike, $ff$, which has a vertical motion up or down, controlled by the screw $x$ and milled head $g$. The milled head $g$ has a groove cut in its outer periphery at its lower end, by which it is confined in the plate $m$, admitting a rotary motion, but not a vertical. It is screw-threaded internally to receive the screw $x$, which is riveted to the bottom of the gage $ff$, as shown at Fig. 7. The gage $ff$ is provided with two lines of graduation, S and P, indicating "shot" and "powder." J J, Fig. 3, are indexes for setting the gage to the proper charge. $b$ is the tube for attaching a funnel for introducing the shot and powder. $i$ and $d$ are slides for closing communication between the chamber T and tube $b$, thus stopping the flow of powder or shot. Instead of the gage $ff$ and chamber T, blocks, Fig. 8, of different thicknesses, having an oblong opening, T', may be placed upon the shell-holder and beneath the block A A'. These are to be of such thickness as to admit the proper charge.

The operation of the device is as follows: Push in the slides $d$ and $i$, closing communication between the tube $b$ and shell-chambers $a\ a$. Turn the milled head $g$ till the proper gage-mark coincides with its index J. Place a funnel on the tube $b$, and pour in the powder. Open the bottom D and insert a shell in each chamber, and close the bottom. Enter the flange of the plate $c$ into the groove $p\ p$, at its right-hand end. Draw the slides $d$ and $i$, and slide the distributer forward with a moderate motion from right to left, holding all in position as shown at Fig. 2. As the distributer passes over the shells, the powder drops into the holes $a\ a\ a$, but is arrested by cut-off flange $c$, until the gage $ff$ has passed over it, striking off its surface, when the flange passes from under it and allows the charge, accurately measured, to fall into the shell below. When the last hole is reached close the slides, remove the distributer, and return any surplus powder remaining in it to its can. Ram wads into the shells without removing them. Adjust the gage for shot as before for the powder, and repeat the operation above described, and the charge of shot will be accurately deposited in the shells.

It will be seen that the shell-holder may be made as long and hold as many shells as desirable, or it may be made double, placing them back to back, or cut in two or more pieces, having sockets at their ends for connecting together, so they may be separated and packed in a trunk or satchel; or it may be made to form the front of a gun-case. The holes may be placed as near together as the nature of the materials will admit, thus making it very compact. Again, the distributer may be stopped at any point, and the gage changed, so as to charge some shells lighter than others. It does away with all scattering and wasting of ammunition while loading, as is the case with the clumsy devices in use. It is very rapid; a thousand shells may be charged in a few minutes.

Having thus described the apparatus, what I claim as my invention, and desire to secure by Letters Patent, is—

1. The shell-holder B B, having the groove $p\ p$, when constructed substantially as shown and specified.

2. The block A A', provided with gage $f f$ and cut-off $c$, in combination with the shell-holder B, when arranged substantially as and for the purpose shown and specified.

3. The combination of the slides $d$ and $i$ with the block A A' and gage $f f$, when arranged substantially as and for the purpose shown and specified.

GEO. W. ANSLEY.

Witnesses:
WM. C. DUSENBURY,
JOHN D. CUYKDALL.